United States Patent [19]

Trevillyan et al.

[11] Patent Number: 5,501,487
[45] Date of Patent: Mar. 26, 1996

[54] DRIVER SIDE ALL MECHANICAL INFLATOR FOR AIRBAG SYSTEMS

[75] Inventors: Dennis A. Trevillyan, Plant City, Fla.; Jeffrey L. Parrish, Troy, Mich.

[73] Assignee: Breed Automotive Technology, Inc., Lakeland, Fla.

[21] Appl. No.: 382,282

[22] Filed: Feb. 1, 1995

[51] Int. Cl.⁶ .................................................. B60R 21/26
[52] U.S. Cl. ...................... 280/736; 280/741; 422/165; 102/531
[58] Field of Search ........................ 280/741, 740, 280/736, 742; 422/164, 165, 166, 167; 102/530, 531

[56] References Cited

U.S. PATENT DOCUMENTS

| | | | |
|---|---|---|---|
| 3,827,715 | 8/1974 | Lynch | 102/531 |
| 3,891,233 | 6/1975 | Damon. | |
| 3,934,984 | 1/1976 | Marlow et al. | 422/167 |
| 4,116,466 | 9/1978 | Gehrig | 280/741 |
| 4,370,930 | 2/1983 | Strasser et al. . | |
| 4,578,247 | 3/1986 | Bolieau | 280/741 |
| 5,069,479 | 12/1991 | Koide et al. . | |
| 5,080,394 | 1/1992 | Mori et al. . | |
| 5,100,171 | 3/1992 | Faigle et al. . | |
| 5,186,491 | 2/1993 | Yoshida et al. . | |
| 5,189,255 | 2/1993 | Fukabori et al. | 280/741 |
| 5,197,757 | 3/1993 | Breed et al. . | |
| 5,201,542 | 4/1993 | Thuen et al. | 280/736 |
| 5,224,734 | 7/1993 | Swiderski | 280/741 |

FOREIGN PATENT DOCUMENTS 4055151  2/1992  Japan ................................ 280/736

Primary Examiner—Margaret A. Focarino
Assistant Examiner—Peter C. English
Attorney, Agent, or Firm—Kane, Dalsimer, Sullivan, Kurucz, Levy, Eisele & Richard

[57] ABSTRACT

An inflator for inflating air bags has a housing for holding a self-sufficient initiator, i.e. an initiator containing a crash sensor and a small explosive charge set off by the sensor. The housing also includes a gas generating material set off by the small charge and filters for filtering the gases. The filters and gas generator material are separated by a choke plate. Advantageously, a portion of the housing is arranged to secure the initiator while the choke plate is securely clamped between two housing members.

8 Claims, 3 Drawing Sheets

DRIVER SIDE ALL MECHANICAL INFLATOR FOR AIRBAG SYSTEMS

BACKGROUND OF THE INVENTION

1. Field of Invention

This invention pertains to improvements for inflators used for passenger restraint systems and more particularly to an all mechanical self-contained inflator on the driver side of an air bag system.

2. Description of the Prior Art

Typical air bag systems consist of one or more crash sensors disposed at several strategic locations in the crush zone of a motor vehicle and coupled to an electronic control circuit, and inflators with air bags disposed in the steering wheel (for the driver side) or the instrument panel (for the passenger side). The inflators are coupled electrically to an electronic control circuit so that when the sensors detect a crash of preselected magnitude, the inflators are set off and generate inflation gases for the air bags. However these systems require extensive wiring between the various parts of the motor vehicle.

In order to eliminate the disadvantages of the above-mentioned systems, all mechanical air bag inflator systems, i.e. systems which do not require electronic circuitry or wiring have been developed by the assignee of the present application as illustrated in U.S. Pat. No. 5,197,757 and U.S. application Ser. No. 008,689 filed Jan. 25, 1993, now U.S. Pat. No. 5,348,340, and incorporated herein by reference. U.S. Pat. No. 5,197,757 pertains to an all mechanical crash sensor. The invention in U.S. application Ser. No. 008,689 pertains to a means for mounting a mechanical inflator in a steering column. The present invention is an improvement of the structure of the inflator itself.

OBJECTIVES AND SUMMARY OF THE INVENTION

An objective of the present invention is to provide an inflator with means for solidly retaining its various internal elements to insure that they remain secured during a crash.

A further objective is to provide an inflator with several elements pre-packaged so that the inflator can be readily assembled in a minimal time period and is less labor intensive than prior art inflators.

A further objective is to provide a reliable inflator which can generate inflation gas quickly, efficiently, and with minimal noxious products.

Other objectives and advantages of the invention shall become apparent from the following description. Briefly an inflator constructed in accordance with this invention includes a first and a second housing member cooperating when attached to form a housing having a central tubular chamber and an outer annular chamber disposed around said tubular chamber. A choke plate is captured by and supported between said first and second housing members to divide said outer chamber into a first portion and a second portion. A gas generating material is disposed in said first portion and filtering means is disposed in said second portion for filtering gases from said material. The choke plate is preferably perforated to provide a path for gases from said inflator material to said filtering means. A portion of one of the members is distorted to secure an initiator.

DETAILED DESCRIPTION OF THE INVENTION

Figure 1:
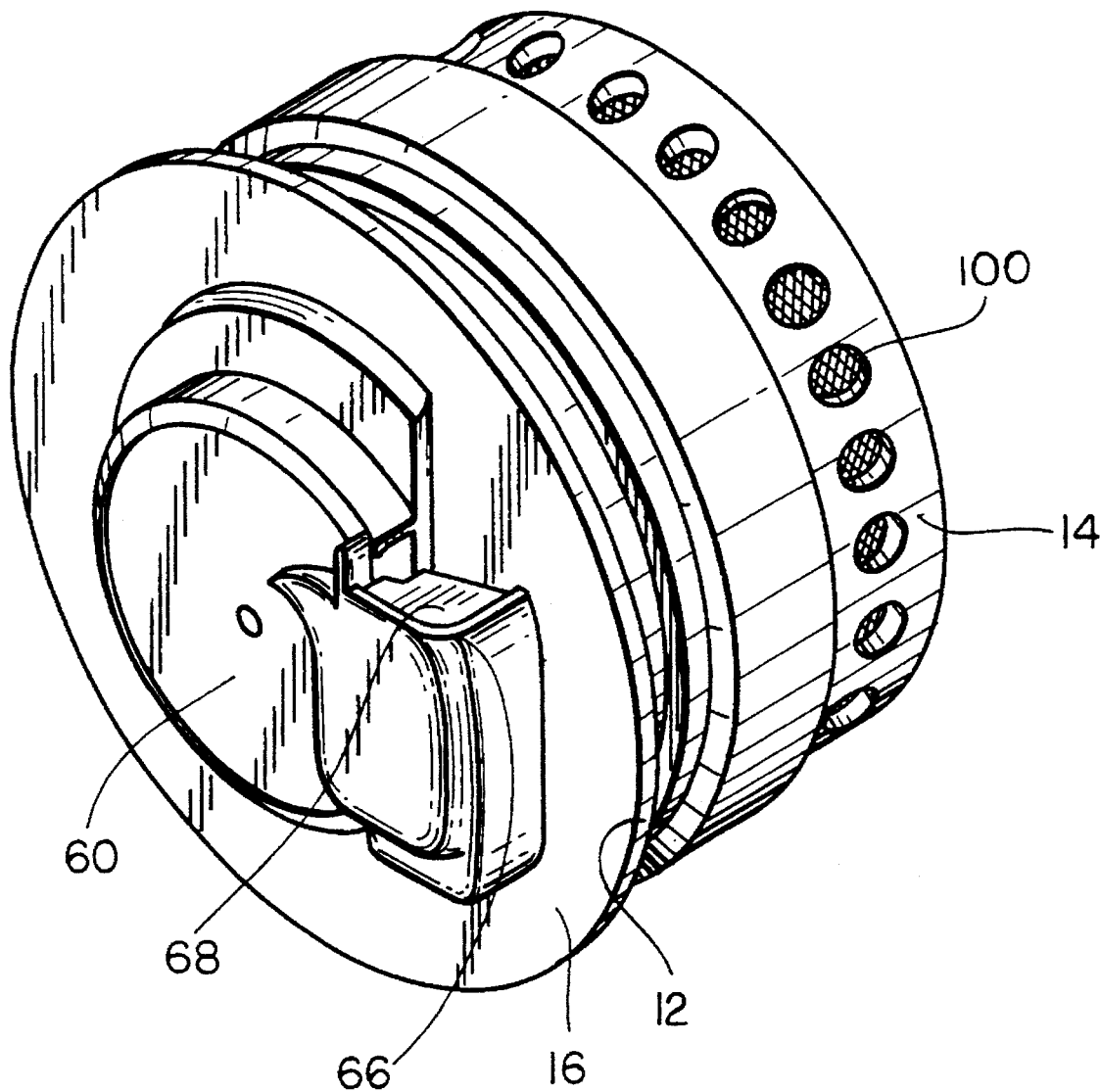
FIG. 1 shows an isometric side view of an inflator constructed in accordance with this invention.

Referring now to the drawings, an inflator constructed in accordance with this invention consists of a housing 10 formed of two cup-shaped members 12, 14. Member 12 is integrally formed of a substantially circular end plate 16, an inner tubular wall 18 and an outer tubular wall 20 disposed concentrically about inner wall 18. Similarly member 14 is integrally formed of an end plate 22, an inner tubular wall 24 and outer tubular wall 26. Inner walls 18, 24 and outer walls 20, 26 are threadedly engaged as at 28, 30 respectively to define an inner tubular chamber 32 and an outer annular chamber 34, as described and claimed in commonly assigned U.S. Pat. No. 5,201,542 incorporated herein by reference. Preferably the two members 12, 14 are made of aluminum, an aluminum alloy or a plastic material.

Figure 2:
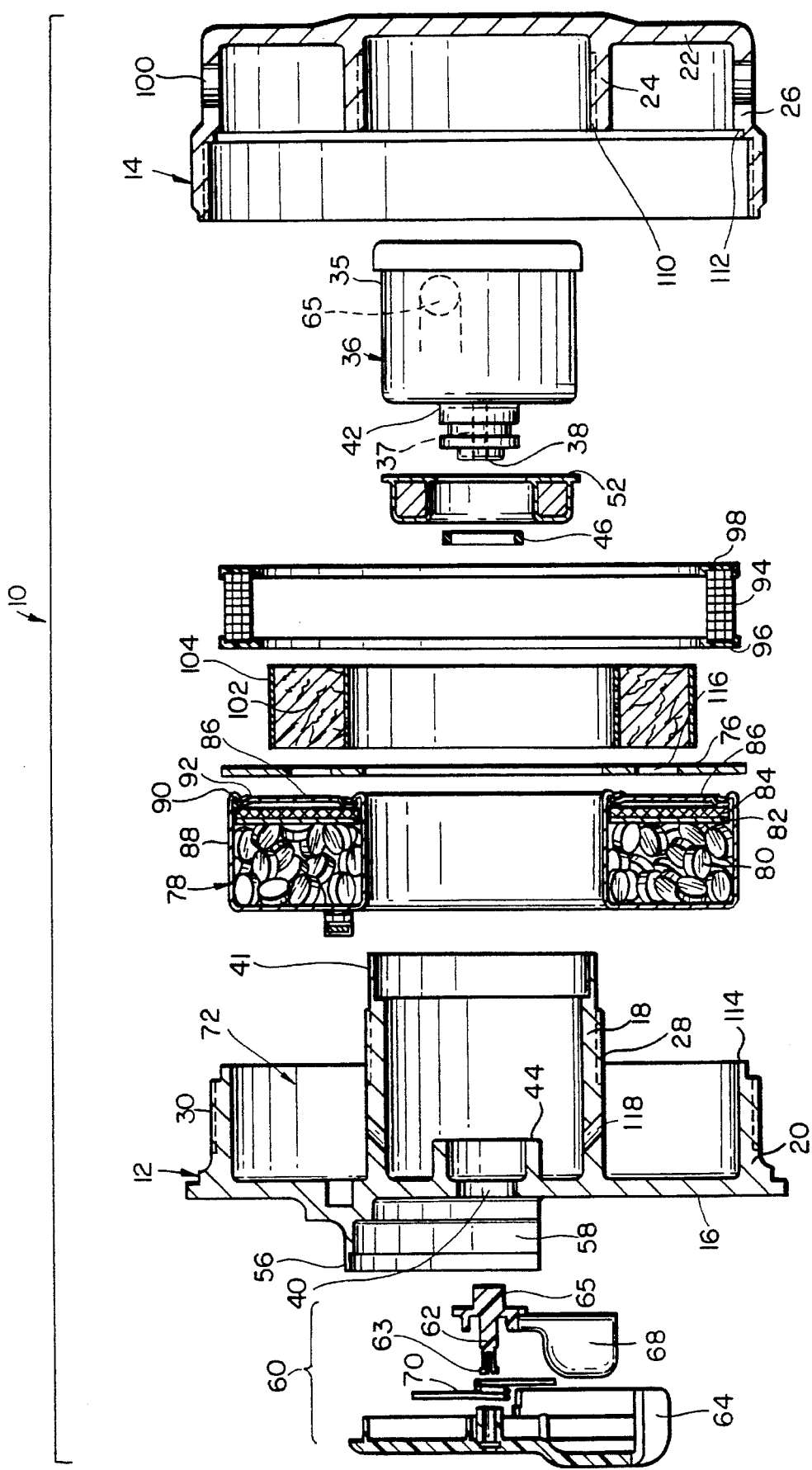
FIG. 2 shows a blow-up side-sectional view of the inflator of FIG. 1.
Figure 3:
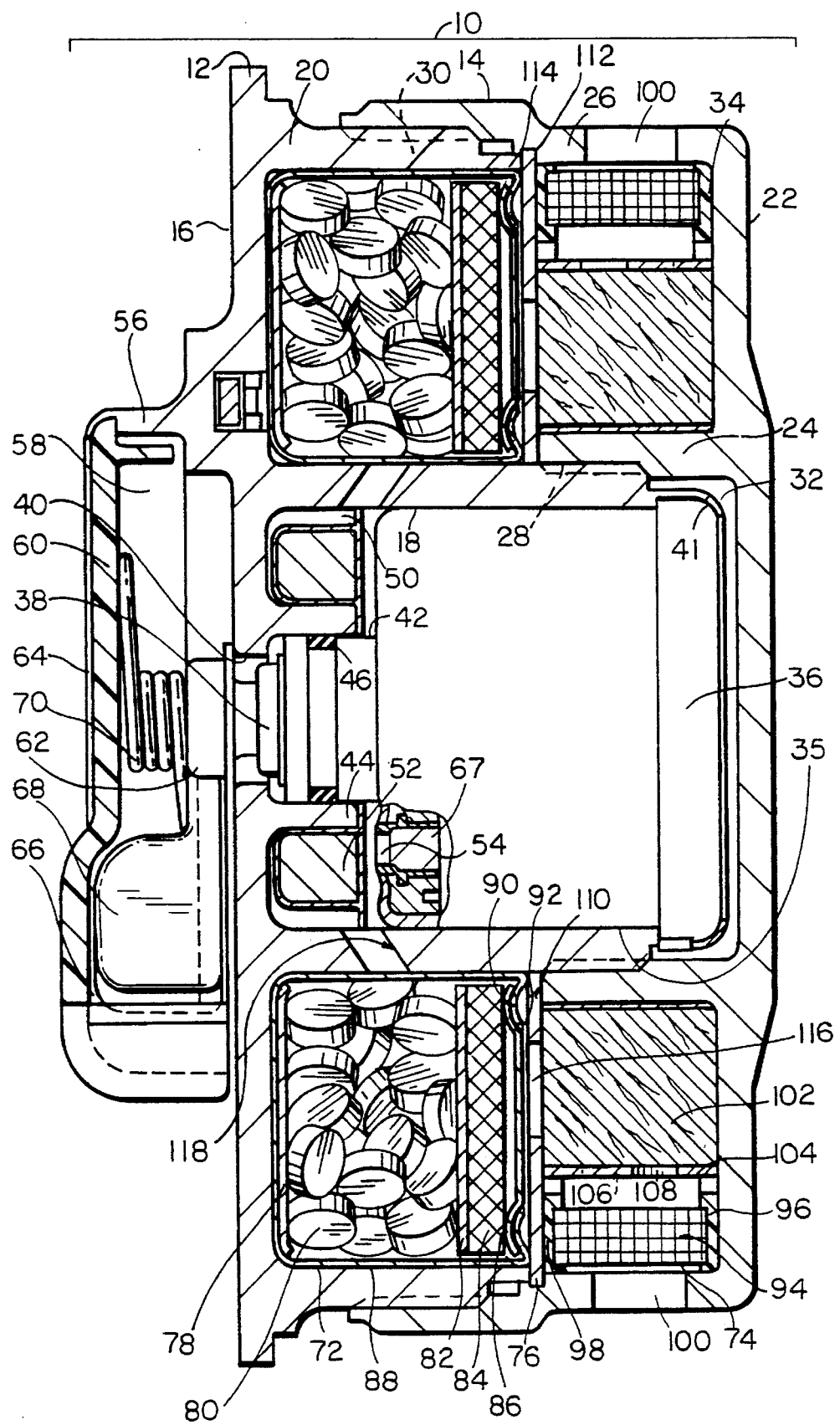
FIG. 3 shows a side cross-sectional view of the assembled inflator.

Chamber 32 houses a mechanical initiator 36 having a substantially cylindrical body 35. The initiator 36 has a rotatable sleeve 38 at one end which is disposed opposite a hole 40 in plate 16. This sleeve 38 has hole 37 having a D-shaped cross-section (not shown) extending coaxially into the initiator 36. Details of this initiator 36 are found in U.S. Pat. No. 5,197,757 mentioned above. Briefly the initiator includes a ball-in-tube sensor shown in outline at 65 (FIG. 2). When the sensor detects a crash of predetermined magnitude, it releases a pair of spring loaded spikes (not shown) which in turn set off two small explosive charges such as charge 67 (FIG. 3). As explained in said patent, the sleeve 38 is rotatable about its longitudinal axis between two angular positions. In one angular position of the sleeve, the initiator 36 is disarmed so that it will not respond to an accidental jolt, such as for example a hammer hit or if the initiator 36 is dropped. In a second angular position of shaft 38, the initiator 36 is armed and therefore is responsive to a crash of predetermined magnitude, as discussed more fully below.

Inner wall 18 has an axially extending thin extension 41 which initially is substantially cylindrical as shown in FIG. 2. After the initiator 36 is installed, this extension 41 is crimped or rolled around a lower portion of the initiator body 35 as shown in FIG. 3. In this manner, the initiator 36 is held securely in place inside the housing 10.

The initiator body 36 has a shoulder 42 which is proximal with an annular lip 44 formed on plate 16. The hole 40 is sealed by a O-ring 46 disposed between initiator 36 and the inner wall of lip 44 as shown. The outer wall of the lip 44, shoulder 42, a portion of inner wall 18 and a portion of the inner surface of plate 16 cooperate to define an annular space 50. This space 50 is used to house an annular ring-shaped package 52 containing an enhancer material. The package 52 is positioned so that it is disposed adjacent to a hole 54 made in the initiator 36 (FIG. 3).

On its outer surface, plate 16 is formed with an arcuate wall 56. This wall defines a cavity 58 for holding an arming mechanism 60.

Arming mechanism 60 includes a rotatable shaft 62, a spring 70 and a cover 64. Shaft 62 is provided on one end with fingers for mounting shaft 62 rotatably and retention to cover 64. At the opposed end the shaft 62 has a boss 65 with a D-shaped cross section (not shown) matching the cross section of hole 37. Attached to shaft 62 and extending radially therefrom is a lever arm 68.

Cover 64 has an access opening 66 (shown in FIG. 1). The shaft 62 is mounted on the cover 64 by fingers 63 with the spring 70 mounted on the shaft 62 between the arm 68 and cover 64 in such a manner that the shaft is biased to a position where the lever arm 68 covers hole 66 as shown in FIG. 3. As previously mentioned, the sleeve 38 of initiator 36 is biased internally so that the initiator is in the disarmed condition. When the initiator 36 is inserted into chamber 32 and the arming mechanism is installed on plate 16, the boss 65 of shaft 62 matches the disarmed position of the sleeve 38 so that the boss 65 can be inserted into hole 37. Thus the sleeve 38, shaft 62 and lever arm 68 cooperate to maintain the initiator 36 disarmed.

Chamber 34 defined between the inner walls 18, 24 and the outer walls 20, 26, is divided into two annular, axially spaced portions 72 and 74, separated by a ring-shaped choke plate 76. Portion 72 is used to hold a sealed toroidal pack 78. Inside pack 78 there are provided a plurality of tablets 80 made of a gas generating material. On the side facing choke plate 76, the pack 78 includes a layer 82 for cushioning the tablets 80, followed axially by an annular layer 84 of a woven material which acts as a prefilter. Finally the pack 78 is closed off by a cover 86. Preferably the pack 78 has an outer housing 88 made of aluminum alloy or similar material which is rolled over the cover 86 as at 90. A bead 92 of UV cured sealant material is applied around the interface between the cover 86 and cup 88 to insure that the pack 78 remains hermetically sealed.

Portion 74 includes an annular fine filter 94 mounted on and supported at the axial ends by respective graphite ring-shaped seals 96 and 98. This fine filter 94 is disposed radially inwardly of a plurality of exit holes 100 formed through outer wall 26.

Disposed radially inwardly of fine filter 94 in portion 74 is an annular slag filter 102. Slag filter 102 is surrounded by a cylindrical baffle 104. This baffle 104 is provided with a plurality of staggered holes 106, 108 (shown in FIG. 3).

Inner wall 24 of member 14 is terminated in an annular surface 110 disposed in a plane normal to the longitudinal axis of the inner wall 24. Outer wall 26 is formed with an annular inner ledge 112 coplanar with surface 110. Choke plate 76 is arranged and constructed so that when it is installed inside the member 14 it is supported on and extends from surface 110 to ledge 112 as shown in FIG. 3. Importantly, as the two members 12, 14 are secured to each other in the position shown in FIG. 3, the annular end 114 of outer wall 30 comes in contact with the choke plate 76 and forms a clamp with the ledge 112 to secure the choke plate 76 between members 12 and 14 as shown in FIG. 3. The choke plate 76 is further supported and reinforced in the axial direction by the baffle 104 which extends between the choke plate 76 and plate 22 of member 14. The choke plate 76 is formed with a plurality of axial holes 116.

The inflator is assembled as follows. The enhancer cup 52 and the initiator 36 with seal 46 are first inserted into member 12 with sleeve 38 facing hole 40. The thin portion 41 of inner wall 18 is then rolled or crimped around the initiator 36 to secure the initiator 36 to member 12. The arming mechanism is also installed on member 12 with boss 65 of shaft 62 extending into hole 37 of the initiator 36 as described above.

Next the pack 78 is installed in portion 72, and the filters 94 and 102, seals 96 and 98 are installed in portion 74 with the choke plate 76 resting on the ledge 112 and surface 110.

The two members 12, 14 are secured to each other by turning one with respect to the other to obtain the arrangement shown in FIG. 3.

As previously mentioned, in this configuration, the initiator 36 is unarmed. The inflator is then installed into the steering mechanism of a motor vehicle, and an elongated object (such as a bolt, not shown) is inserted into hole 66 and advanced until the object forces the lever arm 68 and shaft 62 to pivot by a preselected angle. The pivoting or rotation of shaft 62 forces the sleeve 38 to pivot or rotate likewise sufficiently to arm the initiator 36.

In operation, when the initiator 36 senses a crash exceeding a predetermined magnitude, it sets off the small amount of explosive material 67 which generates gases exiting through hole 54. These gases in turn set off the enhancer 52 which generates additional gases. These additional gases exit through holes 118 (in inner wall 18) under pressure causing a portion of the pack 78 facing the holes 118 to burst inwardly. The gases then enter pack 78 and set off the pellets 80. The gases generated by these pellets 80 through the prefilter 84, break the cover 86 and pass holes 116 of choke plate 74, slag filter 102, holes. 106, 108, filter 94 and finally holes 100 to thereby inflate an air bag (not shown). The prefilter 84 and slag filter 102 remove large particulate matter from the gases and in addition cause molten material within the gases to solidify.

As these inflator gases are generated, the inflator and its various members are under large stresses. The arrangement disclosed herein insures that the inflator remains intact.

Obviously numerous modifications may be made of this invention without departing from its scope as defined in the appended claims.

We claim:

1. An inflator comprising:

a first and a second housing member cooperating when attached to form a housing having a central tubular chamber and an outer annular chamber disposed around said tubular chamber;

a choke plate captured by and supported between said first and second housing members to divide said outer chamber into a first portion and a second portion;

one of said first and second members including an inner cylindrical and an outer cylindrical wall with said choke plate extending between said inner and outer cylindrical walls;

a gas generating material disposed in said first portion;

filtering means disposed in said second portion for filtering gases from said material, said filtering means including a tubular filter member; and a baffle disposed adjacent to said filter member, said baffle being tubular and extending in an axial direction between said first member and said choke plate.

2. The inflator of claim 1 wherein said choke plate is perforated to provide a path for gases from said inflator material to said filtering means.

3. The inflator of claim 1 wherein said baffle supports said choke plate between said inner and said outer walls.

4. The inflator of claim 1 further comprising enhancer means for enhancing a gas charge, said enhancing means being disposed within said inner cylindrical wall.

5. A gas inflator for air bags comprising:

a first and a second housing member, said members cooperating to define a housing having an inner chamber and an outer chamber, each of said members having an inner and an outer wall supported on a circular plate, the walls of one of said members defining an inner and an outer support surface and the other of said members having a contact surface;

a choke plate extending between said support surfaces and clamped between said outer support surface and said contact surface to partition said outer chamber into a first and a second portion, said second portion being formed with exit holes through which inflating gases exit;

an initiator disposed in said inner chamber;

gas generator means disposed in said first portion to form said inflating gases; and filtering means disposed in said second portion to filter said inflating gases, said filtering means including a fine filter disposed adjacent to said exit holes, said filtering means further including a slag filter disposed radially inward of said fine filter, said slag filter including a cylindrical baffle disposed coaxially within said housing.

6. The inflator of claim 5 wherein said baffle is perforated.

7. The inflator of claim 5 wherein said baffle extends from said first member to said choke plate to support said choke plate.

8. The inflator of claim 5 wherein said inner walls and said outer walls are threadedly coupled to each other to form said housing.

* * * * *